(12) United States Patent
Darbari et al.

(10) Patent No.: US 11,379,336 B2
(45) Date of Patent: Jul. 5, 2022

(54) MAILBOX MANAGEMENT BASED ON USER ACTIVITY

(71) Applicant: Microsoft Technology Licensing, LLC, Redmond, WA (US)

(72) Inventors: Divya Darbari, Bellevue, WA (US); Gouthami Kamalnath, Seattle, WA (US); Ke Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 16/410,691

(22) Filed: May 13, 2019

(65) Prior Publication Data

US 2020/0364130 A1    Nov. 19, 2020

(51) Int. Cl.
*G06F 11/34* (2006.01)
*G06F 11/30* (2006.01)
*H04L 51/42* (2022.01)

(52) U.S. Cl.
CPC ...... *G06F 11/3423* (2013.01); *G06F 11/3055* (2013.01); *G06F 11/3433* (2013.01); *G06F 11/3438* (2013.01); *G06F 11/3442* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 8,132,185 B2 | 3/2012 | Ben-Yehuda et al. | |
| 8,301,699 B1 | 10/2012 | Knight et al. | |
| 8,380,675 B1 | 2/2013 | Dwivedi et al. | |
| 8,713,535 B2 | 4/2014 | Malhotra et al. | |
| 9,070,141 B2 | 6/2015 | Hua et al. | |
| 9,203,864 B2 | 12/2015 | Luna et al. | |
| 9,420,400 B2 | 8/2016 | Buyukkoc et al. | |
| 9,632,824 B2 | 4/2017 | Lyubinin et al. | |
| 2004/0199663 A1* | 10/2004 | Horvitz | H04W 4/02 709/238 |
| 2005/0086347 A1* | 4/2005 | Deen | H04L 61/301 709/229 |

(Continued)

FOREIGN PATENT DOCUMENTS

WO    2014063487 A1    5/2014
WO    2015148420 A1    10/2015

OTHER PUBLICATIONS

"International Search Report and Written Opinion Issued in PCT Application No. PCT/US2020/027120", dated Jul. 13, 2020, 12 Pages.

(Continued)

*Primary Examiner* — Qing Chen
(74) *Attorney, Agent, or Firm* — Alleman Hall Creasman & Tuttle LLP

(57) ABSTRACT

A method for managing a mailbox based on user activity comprises receiving output signals from each of a plurality of mailbox workloads. The output signals may be indicative of user activity for each workload. A last user action time may be determined based on the received output signals using pre-determined, workload specific criteria. A pre-determined action may be performed on the mailbox responsive to a lapsed duration from the last user action time increasing above a threshold.

20 Claims, 5 Drawing Sheets

(56) References Cited

U.S. PATENT DOCUMENTS

| | | | |
|---|---|---|---|
| 2007/0294428 A1* | 12/2007 | Guy | G06Q 10/107 |
| | | | 709/245 |
| 2008/0046518 A1* | 2/2008 | Tonnison | G06Q 10/107 |
| | | | 709/206 |
| 2009/0037359 A1 | 2/2009 | Callanan et al. | |
| 2010/0107172 A1 | 4/2010 | Calinescu et al. | |
| 2010/0138500 A1 | 6/2010 | Consul et al. | |
| 2011/0138079 A1* | 6/2011 | Esaka | G06F 16/275 |
| | | | 709/248 |
| 2011/0153753 A1* | 6/2011 | Childress | H04L 51/12 |
| | | | 709/206 |
| 2015/0365359 A1* | 12/2015 | Hasan | H04L 51/10 |
| | | | 709/206 |
| 2016/0308812 A1 | 10/2016 | Johnstone et al. | |
| 2017/0357394 A1* | 12/2017 | Jon | G06F 3/04847 |
| 2019/0138637 A1* | 5/2019 | Hogan | G06Q 50/01 |
| 2019/0182063 A1* | 6/2019 | Singh | H04L 12/1818 |
| 2019/0297046 A1* | 9/2019 | Greenspan | H04L 51/22 |

OTHER PUBLICATIONS

Hilbert, et al., "Agents for Collecting Application Usage Data Over the Internet", In Proceedings of the Second International Conference on Autonomous Agents, vol. 10, Issue 13, May 10, 1998, 8 Pages.

\* cited by examiner

MAILBOX MANAGEMENT BASED ON USER ACTIVITY

BACKGROUND

Mailbox applications have expanded to include numerous workloads that may overlap and co-integrate to aid a user or set of users in managing a plurality of tasks. Platforms and servers that host data for these mailbox applications may process data and interfaces for each workload of the application.

SUMMARY

A method for managing a mailbox based on user activity comprises receiving output signals from each of a plurality of mailbox workloads. The output signals may be indicative of user activity for each workload. A last user action time may be determined based on the received output signals using pre-determined, workload specific criteria. A pre-determined action may be performed on the mailbox responsive to a lapsed duration from the last user action time increasing above a threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Currently, it is difficult to identify whether a mailbox is actively being used by a user. Further, modern mailbox applications include numerous distinct workloads, such as email, contacts, calendars, etc. As such, even if it can be accurately determined that the user is actively using a mailbox, it is challenging to determine which of the workloads are being acted upon.

If a mailbox, or a workload of a mailbox, is idle for a threshold duration, it may be desirable to stop paying the maintenance costs for either a particular workload or the entire mailbox. Cache is a limited resource, as is solid-state device (SSD) storage space. As such, it typically is impossible to maintain data for all mailboxes in a state of rapid retrieval, and it is thus inefficient to maintain inactive mailboxes or workloads in such a state.

Figure 1:
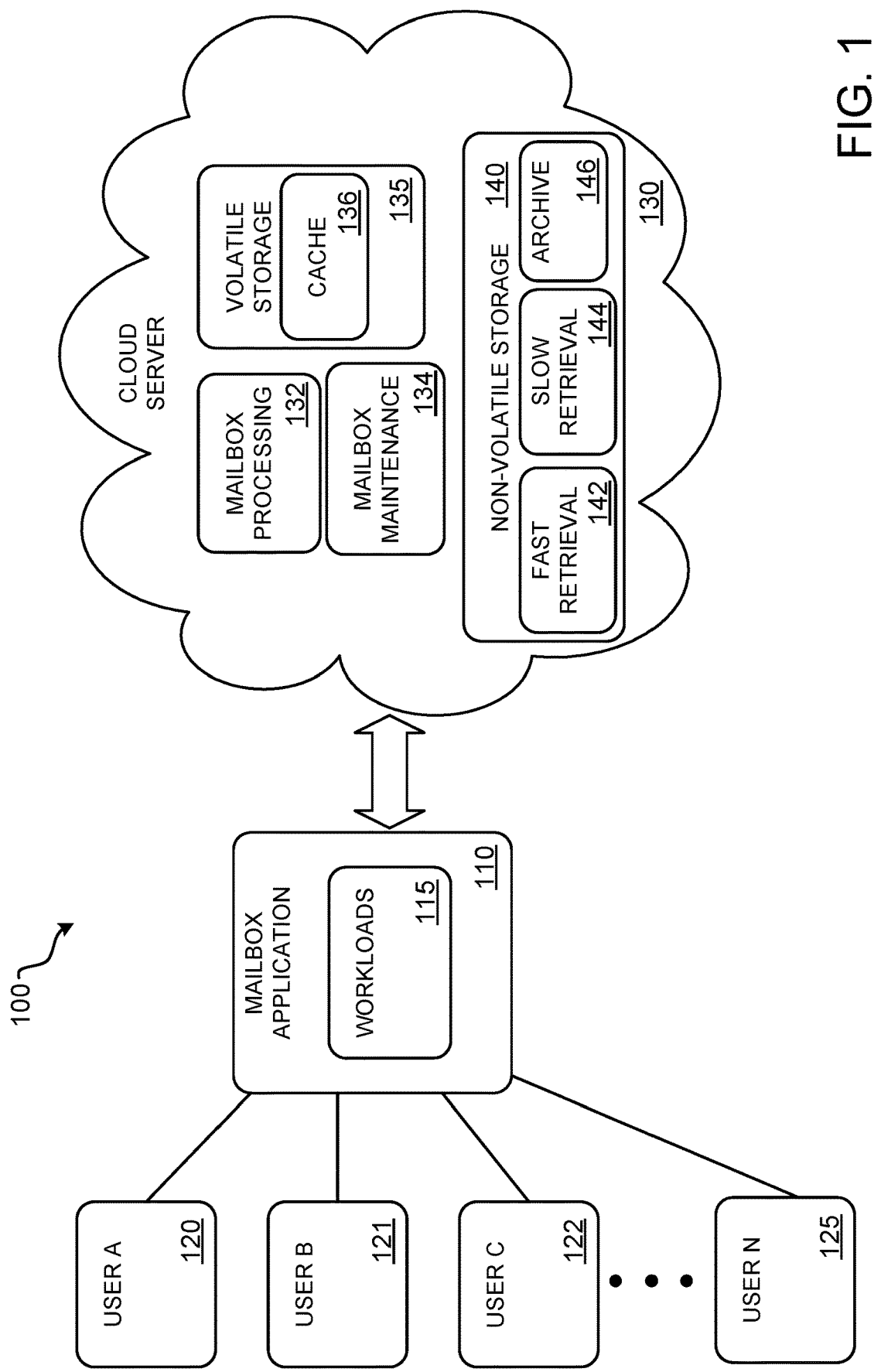
FIG. 1 shows an example computing environment for processing and maintaining a mailbox application.

FIG. 1 shows an example computing environment 100 for processing and maintaining an application, such as mailbox application 110. Mailbox application 110 may include a plurality of workloads 115. Workloads 115 may include email, contacts, tasks, calendars, files, groups, notes, chats, lists, projects, etc.

A plurality of users may establish individual mailbox accounts with mailbox application 110. As examples, FIG. 1 shows user A 120, user B 121, user C 122, and user N 125. Each user may operate a mailbox account including one or more workloads. Users may access their account via one or more networked devices, such as desktop computers, laptop computers, tablet computers, cellular phones, etc. Data for each user of mailbox application 110 may be stored, maintained, and processed at cloud server 130.

Cloud server 130 may host one or more virtual machines, such as mailbox processing 132 and mailbox maintenance 134. Mailbox processing 132 may be configured to process data for each workload, such as unpackaging files, scanning for malware, updating values across related tasks, retrieving new messages, processing outgoing messages for delivery to other users, etc. Mailbox maintenance 134 may be configured to remove redundant data, package unused or stagnant data for long-term storage, update passwords and related metadata, etc.

Volatile storage 135 includes cache 136 that may include volatile memory stores in computing environment 100 that provides access to high I/O activity data at a rate of input/output operations per second (IOPS) that satisfies a cloud provider service-level agreement (SLA). Non-volatile storage 140 may be considered long-term non-volatile data storage media, for example non-volatile memory, within multi-tiered storage-based cloud computing environment 100 that stores data with an I/O activity lower than a threshold value. In other words, mailbox data with a high activity rate may be placed in cache 136. Mailbox data with a lower activity rate may be maintained within non-volatile storage 140.

Within non-volatile storage 140, different tiers of retrieval rate may further delineate rates of data retrieval. Fast retrieval 142 may include solid state disk (SSD) storage with a high rate of retrieval. Slow retrieval 144 may include slower-to-access non-volatile storage media such as hard drive disks (HDDs). Archive 146 may include HDDs that are configured to store archived or compressed mailbox data, or data that otherwise may undergo one or more processing steps prior to being presentable to a user.

Previous attempts to determine whether a user mailbox is active or inactive included recording the last logon time for a user mailbox. For example, a time stamp may be recorded any time a user mailbox was activated to perform any sort of activity. However, this operation counts any user logon, system generated logon, or any background mailbox task equally, and thus does not truly represent user activity or behavior. As such, logon time can't be efficiently leveraged to distinguish active and inactive mailboxes and cannot delineate activity for specific workloads.

Herein, systems and methods are described to classify application usage and activity by workload. Certain user actions related to a particular workload are collected, annotated, and analyzed at regular intervals to determine last user action times for each workload. In this way, each workload for an application, such as a mailbox application, may be categorized as active or inactive. For example, if a user uses emails frequently but hardly uses contacts, the user's mailbox could be marked as active for the email workload and inactive for the contacts workload. Effectively, the definition of user activity for any particular workload may be tied to user actions specific to a particular workload. The particular user activities may be selected as to be generic enough so as not to exclude important user activities, but not too broad in scope to lose effectiveness in classifying activity.

The last user action time for each workload may be leveraged by multiple client applications and/or processors to adjust the processing of active and inactive workloads based on their own criteria and thresholds for activity. This information can be leveraged to save maintenance costs by reducing processing on inactive mailboxes. The information can also be leveraged by different processors to perform diverse tasks such as the optimization of solid-state device (SSD) usage. For example, only active mailboxes may be maintained on SSDs while inactive mailboxes are evicted. Further, workload specific processing may be executed on mailboxes which are active for that particular workload.

Figure 2:
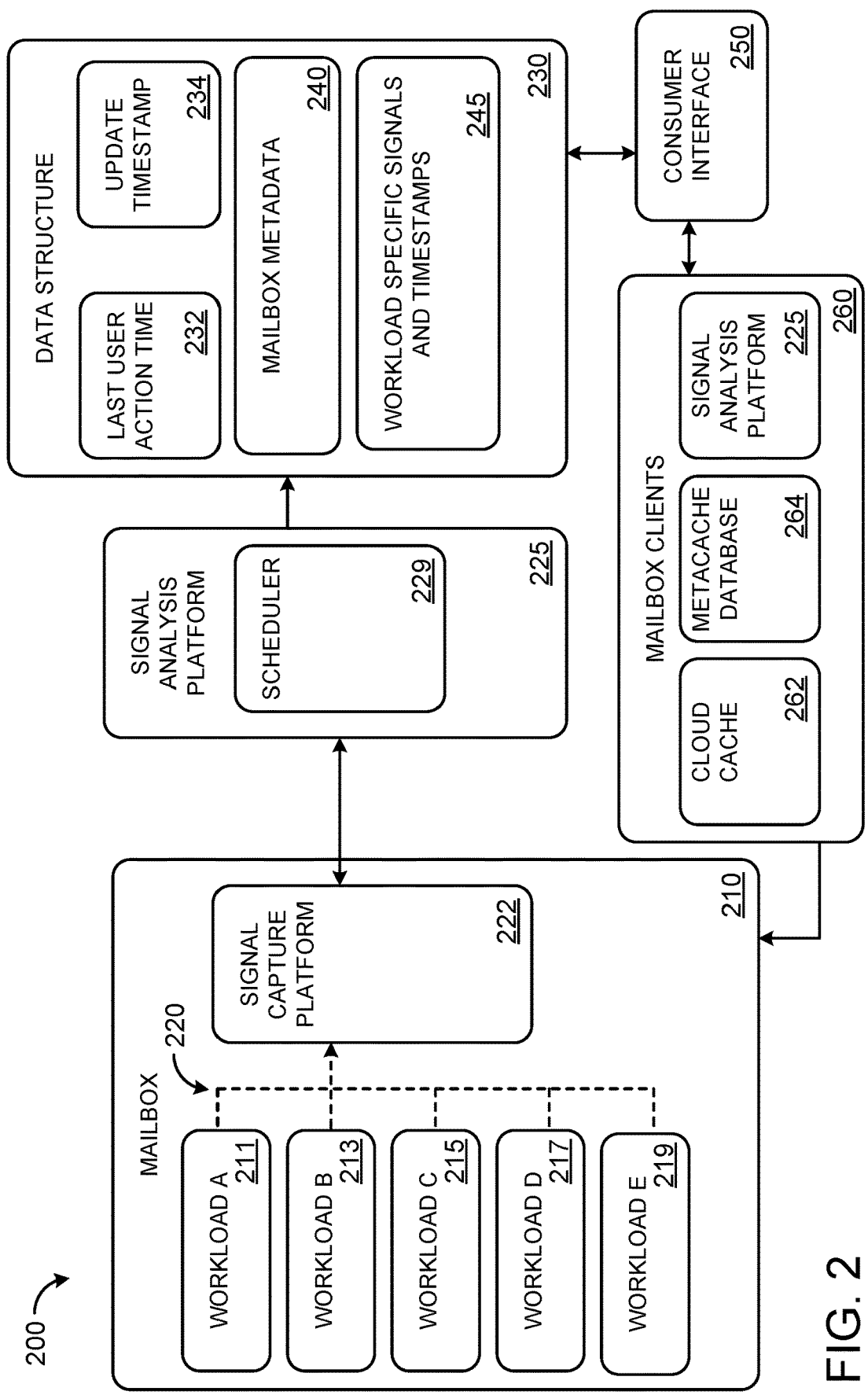
FIG. 2 shows an example system for system for managing a mailbox based on user activity.

FIG. 2 shows an example system 200 for managing an application based on user activity. System 200 may be utilized to identify one or more user actions which indicate user activity. Based on the identified user action, the system may, at regular intervals, precompute and save the last time these user actions were detected for each application. Application clients may access these saved times and adjust management of the corresponding applications accordingly.

System 200 includes a mailbox 210 having a plurality of workloads. In this example, mailbox 210 is shown with five workloads: workload A 211, workload B 213, workload C 215, workload D 217, and workload E 219. However, the number of workloads may be greater or fewer, provided at least two or more workloads are included. For mailbox 210, and similar mailboxes, workloads may include email, contacts, tasks, calendars, files, groups, notes, chats, lists, projects, and other workloads.

In some examples, each workload may have numerous sub-workloads. For example, an email workload may include multiple mailboxes, multiple folders, etc. In some applications, mailbox 210 may include multiple applications for a single user account. Each application may include one or more workloads.

Mailbox 210 is configured to output signals 220 indicative of user activity for each workload. As will be described further herein, each of workloads 211, 213, 215, 217, and 219 may individually output signals (e.g., MessageSent, FileAccessed), and mailbox 210 may additionally output signals (e.g., UserLogin, PasswordChanged). Signal capture platform 222 may be configured to store the received output signals 220. In this example, output signals 220 are stored in mailbox 210, but in some examples output signals 220 may be stored externally to mailbox 210.

Signal analysis platform 225 is configured to receive output signals 220 from mailbox 210 via signal capture platform 222. Signal analysis platform 225 includes scheduler 229. Scheduler 229 may be configured to periodically filter the received output signals stored at signal capture platform 222 based on the pre-determined, workload specific criteria. For example, signal capture platform 222 may capture and store all or many of the signals output by mailbox 210 indiscriminately. Scheduler 229 may periodically filter the stored signals for a pre-determined set of signals and their accompanying time stamps. A most recent signal and timestamp may be output and stored in data structure 230. In some examples, scheduler 229 may acquire metadata from mailbox 210 that is associated with output signals 220. For example, each signal may be accompanied by metadata including, but not limited to, a user ID, a timestamp, a build number for the mailbox and/or workload, etc.

Data structure 230 may store values for last user action time 232, representing a time when the user was last active in mailbox 210, based on the filtered output signals. Data structure 230 may further store values for an update timestamp 234, representing a most recent time when the last user action time was determined. Data structure 230 may be configured as one or more database tables, such as a mailbox table.

Data structure 230 may further store mailbox metadata 240, as well as workload specific signals and timestamps 245. Workload specific signals and timestamps 245 may include timestamp indicating a most recent user activity for a specific workload, based on the filtered signals output by scheduler 229, and/or may include most recent values and timestamps for each of the pre-determined workload specific signals included in filters for scheduler 229. Last user action time 232 may be determined based on the values stored in workload specific signals and timestamps 245.

Consumer interface 250 may be configured to retrieve timestamps from the data structure responsive to receiving an inquiry from the one or more mailbox clients 260. Consumer interface 250 may receive inquiries from mailbox clients 260, and may output timestamps and/or other data based on the inquiries.

Mailbox clients 260 may operate on mailbox and workload data, or otherwise contribute to the processing, maintenance, and storage of mailbox and workload data at the cloud server. Clients may utilize the signal analysis platform 225 to evaluate data stored at data structure 230 and to process specific components of mailbox 210, such as maintenance, admin, etc.

For example, cloud cache 262 may determine which data is stored within the cloud cache and or each user cache, and which data is moved to non-volatile storage. Similarly, metacache database 264 may determine which data is stored in fast retrieval storage (e.g., SSD storage). By moving data, including entire user workloads and mailboxes to fast retrieval, read processing and read operations may be optimized. Last user action time 232 and workload specific signals and timestamps 245 may thus be used to assign active accounts to cache and fast retrieval, while inactive accounts may be assigned to slow retrieval, archived, or deleted. Signal analysis platform 225 may also retrieve data from data structure 230, in order to inform decisions about what mailbox processes to update and when to perform those updates.

Each mailbox client 260 may provide a query regarding the data structure 230 via consumer interface 250, which receives the query, provides the handle for the values to be queried, and interprets the query results for the mailbox client.

As one example, a set of columns may be queried (e.g., Names of workload columns). Data structure 230 is queried for the properties by the clients and the retrieved values include key value pairs to be interpreted. The array of key value pairs for each mailbox are passed to the consumer interface and in turn the set of last user action times 232, update timestamps 234, and any workload specific signals and timestamps 245 are returned for each workload.

Consumer interface 250 may additionally or alternatively provide a mailbox session for which the last user action time 232 is needed. Depending on which workload is queried, the last user action time 232 is returned for the same or overall value for the mailbox for all workloads.

Each mailbox client 260 may provide queries so as to retrieve the data they desire in the format they prefer. For example, signal analysis platform 225 may want workload specific data and request how those values are stored and read out. Cloud cache 262 may be more interested in just date/time for the last user action time 232. Clients can choose to have data processed and reduced to a small number of variables, or can have access to more data and perform their own queries internally. The mailbox client 260 is then responsible for setting thresholds and making decisions as to whether the mailbox or workload is active or inactive by using the last user action update time 232 as a reference.

System 200 may thus be utilized to precompute the last time a user was active for a particular workload and/or mailbox, which then may be used as a criteria to process the mailboxes, thereby leveraging these user activity values to reduce the costs of goods and services associated with mailbox management.

Figure 3:
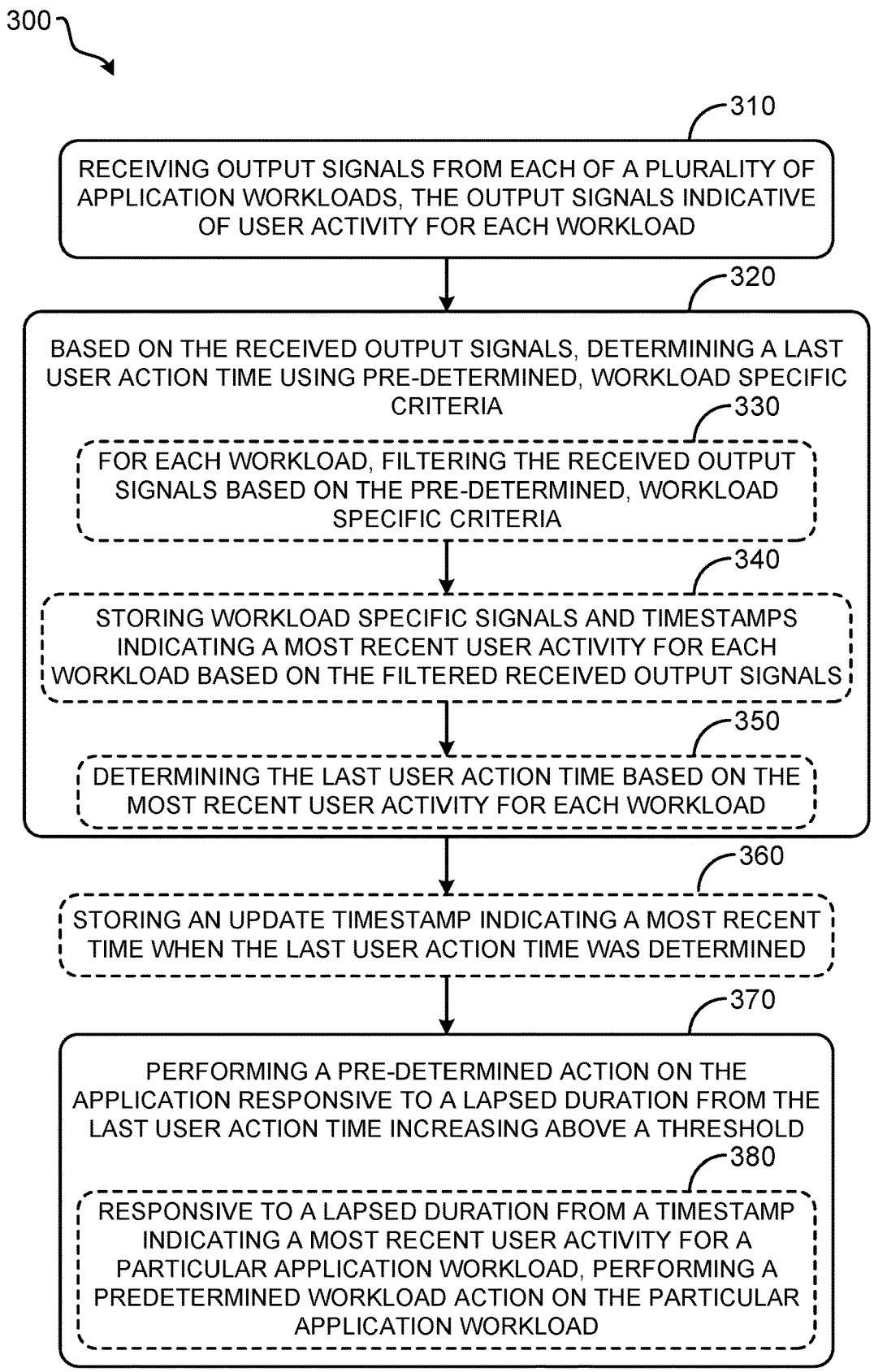
FIG. 3 shows a flow-chart for an example method for managing a mailbox based on user activity.

FIG. 3 shows a flow-chart for an example method 300 for managing an application, such as a mailbox application, based on user activity. Method 300 may be executed by system 200 or similar systems for application management. Method 300 may be implemented to identify whether a mailbox is active based on user actions, and further implemented to annotate different active times for different workloads within a mailbox, thereby ensuring the mailbox clients that are processing and/or managing the mailbox can filter and group mailboxes that are active for particular workloads.

At 310, method 300 includes receiving output signals from each of a plurality of application workloads, the output signals indicative of user activity for each workload. For example, as described with regard to FIG. 2, a signal capture platform, such as signal capture platform 222 may receive and store output signals from a mailbox, such as mailbox 210, as well as from individual workloads. Each user activity is registered prior to the workflow actions being completed. The user activities may be captured by the signal capture platform immediately after they occur or recorded at the mailbox and/or workload and sent to the signal capture platform at a subsequent time. Each user activity and telemetry signal may be stored along with associated metadata including a timestamp assigned by the mailbox, workload, and/or the signal capture platform.

At 320, method 300 includes, based on the received output signals, determining a last user action time using pre-determined, workload specific criteria. For example, a scheduler, such as scheduler 229 may wake up periodically and process data stored at the signal capture platform. The scheduler may evaluate each activity and its related timestamps to determine the last time a user did a particular mail, calendar, or other workload related activity. Based on this activity, a last user action time may be determined, indicating the last time a user performed an activity in this mailbox.

Optionally, at 330, determining a last user action time using pre-determined, workload specific criteria may include for each workload, filtering the received output signals based on the pre-determined, workload specific criteria. For example, user activities may be filtered from system activities or ambiguous activities. A mailbox system may generate similar signals to user activity signals for actions taken by the system on behalf of the user. Such signal generating activity could output signals that have the same name as a user activity, even though user was not performing the activity. For example, previous solutions included evaluating a last user logon time, which may be updated purely via system actions. The criteria may thus only include actions that are performed specifically by the user.

As an example, workload specific criteria for email workloads may include signals such as MarkAsRead, MessageSent, MailView, MessageSelected, etc. Workload specific criteria for contacts workloads may include signals such as ContactCreated, ContactUpdated, ContactView, etc. Workload specific criteria for calendar workloads may include signals such as CreateCalendarEvent, Up dateCalendarEvent, AcceptCalendarEvent, CalendarView, DeclineCalendarEvent, etc. Workload specific criteria for task workloads may include signals such as CreateTask, etc. Workload specific criteria for file workloads may include signals such as FileAccessed, FileModified, FileUploaded, FileDownloaded, FileRenamed, FileDeleted, etc. Workload specific criteria for meeting workloads may include signals such as SendMeetingRequest, AcceptMeetingRequest, etc.

Optionally, at 340, determining a last user action time may further include storing workload specific signals and timestamps indicating a most recent user activity for each workload based on the filtered received output signals. Signals and timestamps may be stored in a data structure, such as a mailbox table.

Optionally, at 350, determining a last user action time using pre-determined, workload specific criteria may include determining the last user action time based on the most recent user activity for each workload. For example, the last user action time may be set equal to the timestamp for the most recent timestamp for all most recent user activities. For example, if the mailbox includes three workloads, the most recently active of the three workloads would be used to determine the last user action time. As such, the last user action time is determined based on individual workloads, rather than activities distributed over all workloads. The last user action time may thus function as an aggregator that takes in signals irrespective of workloads.

At 360, method 300 optionally includes storing an update timestamp indicating a most recent time when the last user action time was determined. As the volume of signals emanating from each mailbox may be high, it may not always be practical to operate the scheduler constantly or at a high usage rate. Further, some system bugs and system overloads may cause scheduler delays. A service level agreement may establish a minimum time between updates. The update timestamp thus indicates how fresh a last user action time is, and informs mailbox clients as to when the values were last updated.

In some examples, multiple versions of the last user action time and/or the workload specific user activities may be stored in separate columns of the data structure. For example, a first last user action time may be determined based on a first set of pre-determined workload specific criteria, and a second last user action time may be determined based on a second set of pre-determined workload specific criteria. In this way, different mailbox clients may have access to last user action times that meet their own individual criteria for processing and/or managing mailboxes and their individual workloads. This may be controlled by the consumer interface.

Further, this may enable comparison between a "stable" version of the criteria and filters employed by the scheduler and an "experimental" version of the criteria and filters. In this way, collection of stable data may continue while also adjusting the list of criteria. Once the updated criteria is deemed stable enough to be portioned out to mailbox clients, out, the new column may be activated. If in this process an unexpected bug or issue is detected, the previous column may be reactivated. Resilience feature or safety net. When the new column is deemed sufficiently stable, the old column may be employed for experimenting. Switching between criteria, filters, active columns, etc. may be controlled via fighting. The active column may be conveyed to the consumer interface and thus to the mailbox clients. A subset of mailbox clients may have access to the data stored in the experimental column.

At 370, method 300 includes, performing a pre-determined action on the application responsive to a lapsed duration from the last user action time increasing above a threshold. Optionally, at 380, method 300 includes performing a pre-determined action on the application may include, responsive to a lapsed duration from a timestamp indicating a most recent user activity for a particular application workload, performing a pre-determined workload action on the particular application workload.

For example, a mailbox client may compare the last user action time to a threshold (e.g, 30 days). If the value is above the threshold, the mailbox client may cease to pay the maintenance costs for the mailbox. When the user becomes active again, the value is updated, and additional processing begins again.

The retrieved values may also used in determining which mailboxes are active overall, and thus determine which of the mailboxes are maintained in order to speed up the reading process. Cache is a limited resource, and only a subset of mailboxes may be maintained in the cache. In this way, for the active mailboxes the read is fast; if the mailbox is inactive, latency may be introduced. The cloud cache decides what to maintain the in the cache based on recent activity, and may move mailboxes out of the cache if the threshold is breached. Similarly, the metacache database may move mailboxes off of a fast-retrieval storage to a slower retrieval storage.

Last user action time thresholds may be client specific, and may be limited by how fast the last user action time can be updated. When reset due to activity, the client may decide to maintain the mailbox or workload from that point until the threshold is reached. Multiple thresholds may be applied. For example, cloud cache may archive certain mailboxes when a first threshold is passed, and may delete certain mailboxes responsive to a second threshold being passed.

Figure 4:
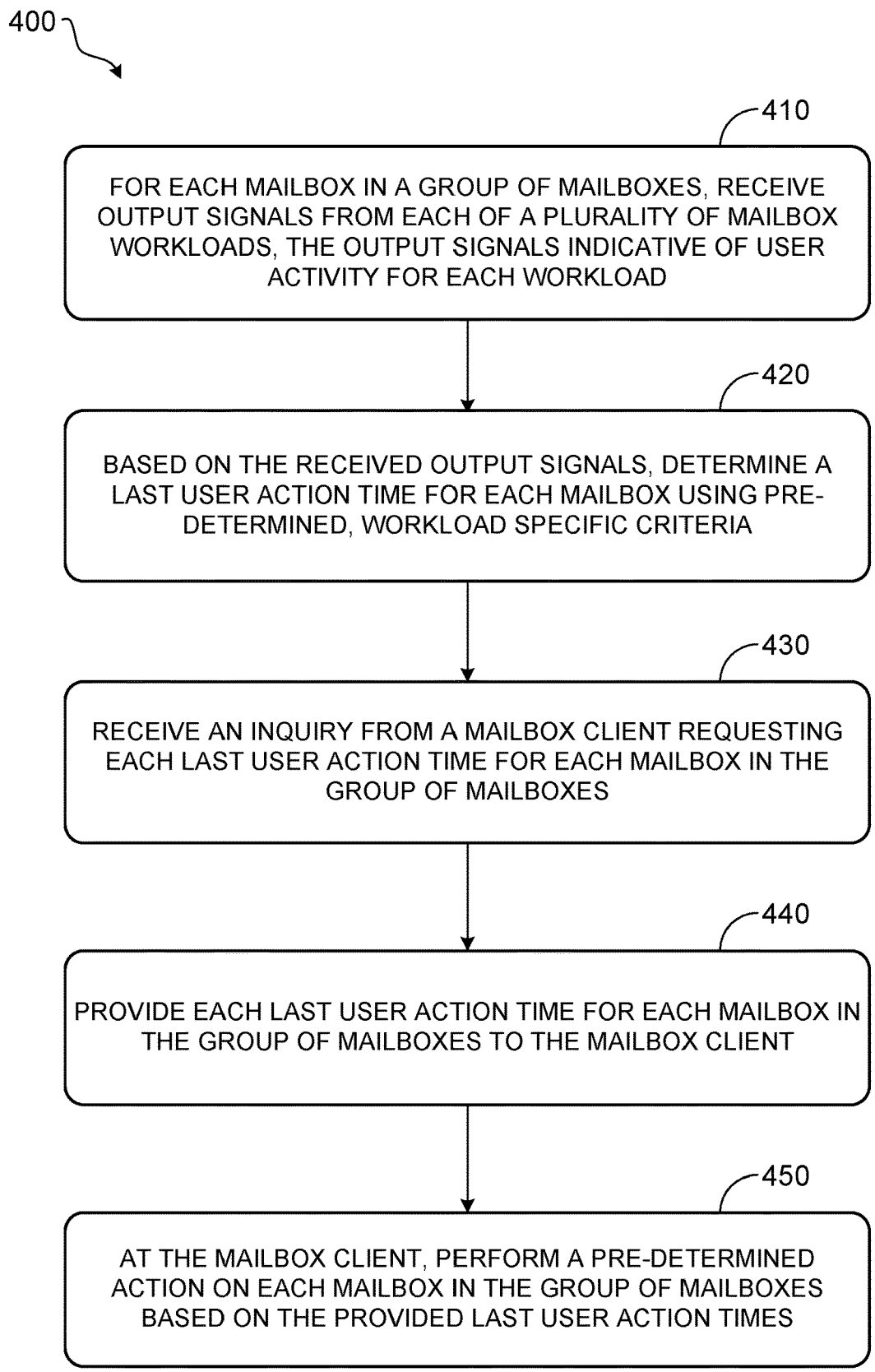
FIG. 4 shows a flow-chart for an example method for managing a group of mailboxes based on user activity.

Mailbox clients may also use the last user action time to enact changes that impact numerous user mailboxes and workloads. For example, FIG. 4 shows an example method 400 for managing a group of mailboxes based on user activity. At 410, method 400 includes for each mailbox in a group of mailboxes, receiving output signals from each of a plurality of mailbox workloads, the output signals indicative of user activity for each workload. Such output signals may be received at a signal capture platform, such as signal capture platform 222, as described with regard to FIG. 3 at 310, for example.

At 420, method 400 includes based on the received output signals, determining a last user action time for each mailbox using pre-determined, workload specific criteria. A scheduler, such as scheduler 229 may wake up periodically and process data stored at the signal capture platform, as described with regard to FIG. 3 at 320, for example.

At 430, method 400 includes receiving an inquiry from a mailbox client requesting each last user action time for each mailbox in the group of mailboxes. For example, a mailbox client may submit an inquiry to a consumer interface, such as consumer interface 250, requesting the last user action time for each mailbox in the group of mailboxes, and/or one or more sets of workload specific signals and timestamps indicating a most recent user activity for one or more workloads within each mailbox.

At 440, method 400 includes providing each last user action time for each mailbox in the group of mailboxes to the mailbox client. For example, the consumer interface may retrieve timestamps from a data structure responsive to receiving the inquiry from the mailbox client. The consumer interface may output timestamps and/or other data based on the inquiries, such as update timestamps, metadata, and/or workload specific signals and time stamps.

At 450, method 400 may include, at the mailbox client, performing a pre-determined action on each mailbox in the group of mailboxes based on the provided last user action times. For example, the mailbox client may determine a ratio of active mailboxes to inactive mailboxes based on a comparison of each last user action time to a first threshold. For example, an activity threshold may be set at twenty-four hours. Mailboxes having a last user action time greater than twenty-four hours may be classified as inactive. Mailboxes having a last user action time less than twenty-four hours may be classified as active. In other examples, the last user action times may be evaluated based on frequency, for example, evaluating the last user action time for a workload over a pre-determined duration to determine how frequently a workload is used.

The mailbox client may then take a pre-determined action responsive to the determined ratio increasing above a second threshold. For example, the mailbox client, such as cloud cache may adjust the storage location of one or more mailboxes based on the determined ratio. As a limited amount of cache is available, the cloud cache may determine a number of mailboxes that may be stored in cache, assign the most active mailboxes to cache, and assign less active mailboxes to non-volatile storage. Similarly, a metacache database may assign a certain number of mailboxes to fast retrieval based on the ratio of active to inactive mailboxes. The threshold may be adjusted based on available storage resources.

In some examples, the pre-determined action may include updating one or more workloads for each mailbox in the group of mailboxes based on the determined ratio. For example, if a workload is not being used by a threshold number of users, it may be deleted, de-prioritized, or moved to less active storage mediums. This data may also be used to determine whether to continue support for features, how an updated version of a feature is being used compared to a sunsetting version of the feature, etc.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
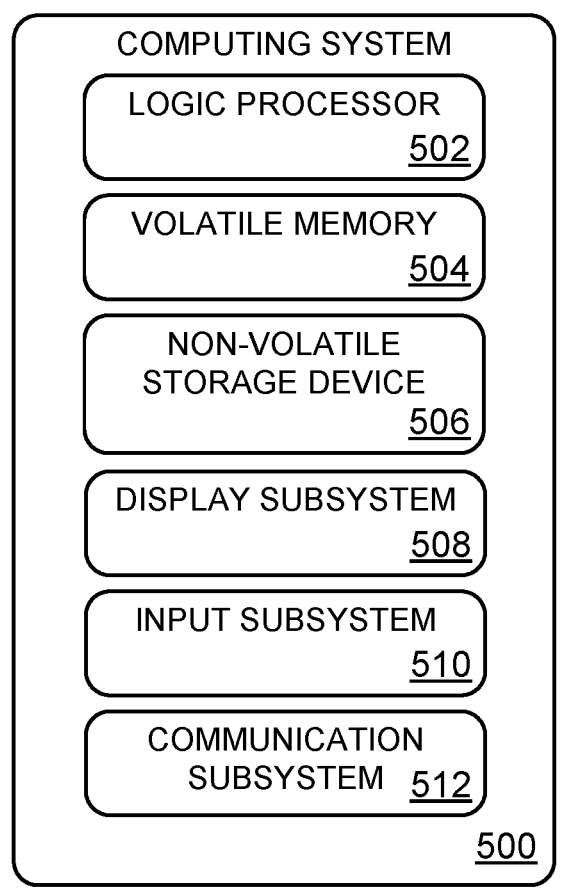
FIG. 5 shows a schematic view of an example computing device with which the methods of FIGS. 3 and 4 may be enacted.

FIG. 5 schematically shows a non-limiting embodiment of a computing system 500 that can enact one or more of the methods and processes described above. Computing system 500 is shown in simplified form. Computing system 500 may embody the computing environment 100 described above and illustrated in FIG. 1 and/or the system 200 described above and illustrated in FIG. 2. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

In one example, a method for managing a mailbox based on user activity comprises receiving output signals from each of a plurality of mailbox workloads, the output signals indicative of user activity for each workload; based on the received output signals, determining a last user action time using pre-determined, workload specific criteria; and performing a pre-determined action on the mailbox responsive to a lapsed duration from the last user action time increasing above a threshold. In such an example, or any other example, the method additionally or alternatively comprises for each workload, filtering the received output signals based on the pre-determined, workload specific criteria; storing a timestamp indicating a most recent user activity for each workload based on the filtered received output signals; and determining the last user action time based on the most recent user activity for each workload. In any of the preceding examples, or any other example, the output signals are additionally or alternatively captured via a signal capture platform and stored at the mailbox, and wherein a scheduler is additionally or alternatively configured to periodically filter the stored output signals based on the pre-determined, workload specific criteria. In any of the preceding examples, or any other example, the method additionally or alternatively comprises: responsive to a lapsed duration from a timestamp indicating a most recent user activity for a particular mailbox workload has increased above a threshold, performing a pre-determined workload action on the particular mailbox workload. In any of the preceding examples, or any other example, the method additionally or alternatively comprises storing an update timestamp indicating a most recent time when the last user action time was determined. In any of the preceding examples, or any other example, the pre-determined action additionally or alternatively includes one or more of: ceasing to pay maintenance costs for the mailbox, moving the mailbox off from a fast-retrieval storage to a slower retrieval storage, and moving the mailbox out of a user cache.

In another example, a system for managing a mailbox based on user activity comprises a mailbox having a plurality of workloads, the mailbox configured to output signals indicative of user activity for each workload; a signal analysis platform configured to: receive output signals from the mailbox; based on the received output signals, determine a last user action time based on pre-determined, workload specific criteria; and store the last user action time in a data structure; and one or more mailbox clients configured to: receive the last user action time stored in the data structure; and perform a pre-determined action on the mailbox responsive to a lapsed duration from the received last user action time increasing above a threshold. In such an example, or any other example, the signal analysis platform is additionally or alternatively further configured to store an update timestamp in the data structure indicating a most recent time when the last user action time was determined. In any of the preceding examples, or any other example, the mailbox additionally or alternatively includes: a signal capture platform configured to store the received output signals; and wherein the signal analysis platform additionally or alternatively includes a scheduler configured to periodically filter the stored, received output signals based on the pre-determined, workload specific criteria. In any of the preceding examples, or any other example, the scheduler is additionally or alternatively configured to: for each workload, store a workload specific timestamp indicating a most recent user activity for each workload based on the filtered, stored, received output signals, and wherein the last user action time is determined based on the most recent user activity for each workload. In any of the preceding examples, or any other example, the one or more mailbox clients are additionally or alternatively configured to: perform a pre-determined workload action on a particular mailbox workload responsive to a lapsed duration from a timestamp indicating a most recent user activity for the particular mailbox workload increasing above a threshold. In any of the preceding examples, or any other example, the system additionally or alternatively comprises a consumer interface configured to retrieve timestamps from the data structure responsive to receiving an inquiry from the one or more mailbox clients. In any of the preceding examples, or any other example, the pre-determined action additionally or alternatively includes one or more of ceasing to pay maintenance costs for the mailbox, moving the mailbox off from a fast-retrieval storage to a slower retrieval storage, and moving the mailbox out of a user cache. In any of the preceding examples, or any other example, the data structure additionally or alternatively includes one or more mailbox tables configured to store metadata associated with the mailbox.

In yet another example, a method for managing a group of mailboxes based on user activity, comprises: for each mailbox in the group of mailboxes, receiving output signals from each of a plurality of mailbox workloads, the output signals indicative of user activity for each workload; based on the received output signals, determining a last user action time for each mailbox using pre-determined, workload specific criteria; receiving an inquiry from a mailbox client requesting each last user action time for each mailbox in the group of mailboxes; providing each last user action time for each mailbox in the group of mailboxes to the mailbox client; and at the mailbox client, performing a pre-determined action on each mailbox in the group of mailboxes based on the provided last user action times. In such an example, or any other example, the inquiry from the mailbox client additionally or alternatively requests one or more sets of workload specific signals and timestamps indicating a most recent user activity for one or more workloads within each mailbox. In any of the preceding examples, or any other example, the method additionally or alternatively comprises performing a pre-determined workload action on a particular mailbox workload for each mailbox of the group of mailboxes based on the timestamps indicating the most recent user activity for the particular mailbox workload. In any of the preceding examples, or any other example, the pre-determined action additionally or alternatively includes one or more of; ceasing to pay maintenance costs for the group of mailboxes, moving the group of mailboxes from a fast-retrieval storage to a slower retrieval storage, and moving the group of mailboxes out of a cache. In any of the preceding examples, or any other example, the output signals are additionally or alternatively captured via a signal capture platform and stored at each mailbox in the group of mailboxes, and wherein a scheduler is additionally or alternatively configured to periodically filter the stored output signals based on the pre-determined, workload specific criteria. In any of the preceding examples, or any other example, the method additionally or alternatively comprises storing an update timestamp indicating a most recent time when the last user action time was determined for each mailbox in the group of mailboxes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for managing a mailbox application based on user activity, comprising:

receiving output signals from each distinct mailbox workload of a plurality of distinct mailbox workloads included in the mailbox application, wherein the received output signals include signals indicative of user activity for a respective distinct mailbox workload, and signals indicative of system activity for the mailbox application;

for each distinct mailbox workload of the plurality of distinct mailbox workloads of the mailbox application, filtering the received output signals based on pre-determined mailbox workload specific criteria, wherein the pre-determined mailbox workload specific criteria include actions performed specifically by a user, such that user activities for the distinct mailbox workload of the plurality of distinct mailbox workloads of the mailbox application are filtered from system activities for the mailbox application;

based on the filtered, received output signals, determining a last user action time for the mailbox application using the pre-determined mailbox workload specific criteria; and performing a pre-determined mailbox workload action on the mailbox application responsive to a lapsed duration from the determined last user action time for the mailbox application increasing above a threshold.

2. The method of claim 1, further comprising:

storing a timestamp indicating a most recent user activity for each distinct mailbox workload of the plurality of distinct mailbox workloads of the mailbox application based on the filtered, received output signals;

determining the last user action time for the mailbox application based on the most recent user activity for each distinct mailbox workload of the plurality of distinct mailbox workloads of the mailbox application; and determining when to perform an update to one or more mailbox processes based on the determined last user action time for the mailbox application.

3. The method of claim 2, wherein the filtered, received output signals are captured via a signal capture platform and stored at the mailbox application, and wherein a scheduler is configured to periodically filter the stored, received output signals based on the pre-determined mailbox workload specific criteria to at least determine a last time the user performed each specific mailbox workload activity of a plurality of specific mailbox workload activities.

4. The method of claim 2, further comprising:

responsive to a lapsed duration from a timestamp indicating a most recent user activity for a particular distinct mailbox workload has increased above a threshold, performing a pre-determined mailbox workload action on the particular distinct mailbox workload, but not on other distinct mailbox workloads of the mailbox application.

5. The method of claim 1, further comprising:

storing an update timestamp indicating a most recent time when the last user action time for the mailbox application was determined.

6. The method of claim 1, wherein the pre-determined mailbox workload action applies to each distinct mailbox workload of the plurality of distinct mailbox workloads of the mailbox application, and wherein the pre-determined mailbox workload action includes one or more of: ceasing to pay maintenance costs for the mailbox application, moving the mailbox application off from a fast-retrieval storage to a slower retrieval storage, and moving the mailbox application out of a user cache.

7. A system for managing a mailbox application based on user activity, comprising:

a processor;

a memory;

a mailbox application having a plurality of distinct mailbox workloads, wherein the mailbox application is configured to output signals including signals indicative of user activity for a respective distinct mailbox workload, and signals indicative of system activity for the mailbox application;

a signal analysis platform configured to:

receive output signals from each distinct mailbox workload of the plurality of distinct mailbox workloads included in the mailbox application via a communication subsystem;

for each distinct mailbox workload of the plurality of distinct mailbox workloads of the mailbox application, filter the received output signals based on pre-determined mailbox workload specific criteria, wherein the pre-determined mailbox workload specific criteria include actions performed specifically by a user, such that user activities for the distinct mailbox workload of the plurality of distinct mailbox workloads of the mailbox application are filtered from system activities for the mailbox application;

based on the filtered, received output signals, determine a last user action time for the mailbox application based on the pre-determined mailbox workload specific criteria; and store the last user action time for the mailbox application in a data structure; and one or more mailbox clients configured to:

receive the last user action time for the mailbox application stored in the data structure; and perform a pre-determined mailbox workload action on the mailbox application responsive to a lapsed duration from the received last user action time for the mailbox application increasing above a threshold.

8. The system of claim 7, wherein the signal analysis platform is further configured to store an update timestamp in the data structure indicating a most recent time when the last user action time for the mailbox application was determined.

9. The system of claim 7, wherein the mailbox application further includes:

a signal capture platform configured to store the filtered, received output signals; and wherein the signal analysis platform includes a scheduler configured to periodically filter the stored, received output signals based on the pre-determined mailbox workload specific criteria.

10. The system of claim 9, wherein the scheduler is further configured to:

for each distinct mailbox workload of the plurality of distinct mailbox workloads of the mailbox application, store a mailbox workload specific timestamp indicating a most recent user activity for each distinct mailbox workload of the plurality of distinct mailbox workloads of the mailbox application based on the filtered, stored, received output signals, wherein the last user action time for the mailbox application is determined based on the most recent user activity for each distinct mailbox workload of the plurality of distinct mailbox workloads of the mailbox application.

11. The system of claim 10, wherein the one or more mailbox clients are further configured to:
- perform a pre-determined mailbox workload action on a particular distinct mailbox workload responsive to a lapsed duration from a timestamp indicating a most recent user activity for the particular distinct mailbox workload increasing above a threshold.

12. The system of claim 7, further comprising:
- a consumer interface configured to retrieve timestamps from the data structure responsive to receiving an inquiry from the one or more mailbox clients.

13. The system of claim 7, wherein the pre-determined mailbox workload action includes one or more of: ceasing to pay maintenance costs for the mailbox application, moving the mailbox application off from a fast-retrieval storage to a slower retrieval storage, and moving the mailbox application out of a user cache.

14. The system of claim 7, wherein the data structure includes one or more mailbox tables configured to store metadata associated with the mailbox application.

15. A method for managing a group of mailbox applications based on user activity, comprising:
- for each mailbox application in the group of mailbox applications, each mailbox application including a plurality of distinct mailbox workloads, receiving output signals from each distinct mailbox workload of the plurality of distinct mailbox workloads, wherein the received output signals include signals indicative of user activity for a respective distinct mailbox workload, and signals indicative of system activity for the mailbox application;
- for each distinct mailbox workload of the plurality of distinct mailbox workloads of the mailbox application, filtering the received output signals based on pre-determined mailbox workload specific criteria, wherein the pre-determined mailbox workload specific criteria include actions performed specifically by a user, such that user activities for the distinct mailbox workload of the plurality of distinct mailbox workloads of the mailbox application are filtered from system activities for the mailbox application;
- based on the filtered, received output signals, determining a last user action time for each mailbox application in the group of mailbox applications using the pre-determined mailbox workload specific criteria;
- receiving an inquiry from a mailbox client requesting each last user action time for each mailbox application in the group of mailbox applications;
- providing each last user action time for each mailbox application in the group of mailbox applications to the mailbox client; and
- at the mailbox client, performing a pre-determined mailbox workload action on each mailbox application in the group of mailbox applications based on the provided last user action time for each mailbox application in the group of mailbox applications.

16. The method of claim 15, wherein the inquiry from the mailbox client further requests one or more sets of mailbox workload specific signals and timestamps indicating a most recent user activity for one or more distinct mailbox workloads within each mailbox application in the group of mailbox applications.

17. The method of claim 16, further comprising:
- performing a pre-determined mailbox workload action on a particular distinct mailbox workload for each mailbox application in the group of mailbox applications based on the timestamps indicating the most recent user activity for the particular distinct mailbox workload.

18. The method of claim 15, wherein the pre-determined mailbox workload action includes one or more of: ceasing to pay maintenance costs for the group of mailbox applications, moving the group of mailbox applications from a fast-retrieval storage to a slower retrieval storage, and moving the group of mailbox applications out of a user cache.

19. The method of claim 15, wherein the filtered, received output signals are captured via a signal capture platform and stored at each mailbox application in the group of mailbox applications, and wherein a scheduler is configured to periodically filter the stored, received output signals based on the pre-determined mailbox workload specific criteria.

20. The method of claim 19, further comprising:
- storing an update timestamp indicating a most recent time when the last user action time was determined for each mailbox application in the group of mailbox applications.

* * * * *